United States Patent
Scholl et al.

(10) Patent No.: US 8,411,667 B2
(45) Date of Patent: Apr. 2, 2013

(54) METHODS, APPARATUS AND ARTICLES OF MANUFACTURE TO MANIPULATE PACKET ROUTING

(75) Inventors: Thomas Bradley Scholl, Seattle, WA (US); Han Q. Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 386 days.

(21) Appl. No.: 12/638,552

(22) Filed: Dec. 15, 2009

(65) Prior Publication Data

US 2011/0142054 A1    Jun. 16, 2011

(51) Int. Cl.
*H04L 12/28* (2006.01)
(52) U.S. Cl. ......................................... 370/351; 370/392
(58) Field of Classification Search .................. None
See application file for complete search history.

(56) References Cited

U.S. PATENT DOCUMENTS

| | | | |
|---|---|---|---|
| 5,815,664 A * | 9/1998 | Asano ............................ | 709/227 |
| 6,088,443 A | 7/2000 | Darland et al. | |
| 7,243,161 B1 | 7/2007 | Tappan et al. | |
| 7,616,637 B1 * | 11/2009 | Lee et al. ........................ | 370/394 |
| 2003/0031192 A1 * | 2/2003 | Furuno ........................... | 370/409 |
| 2004/0174879 A1 * | 9/2004 | Basso et al. .................... | 370/392 |
| 2004/0202171 A1 * | 10/2004 | Hama .......................... | 370/395.1 |
| 2004/0223500 A1 * | 11/2004 | Sanderson et al. ........ | 370/395.53 |
| 2007/0019676 A1 * | 1/2007 | Kompella ...................... | 370/468 |
| 2008/0062891 A1 | 3/2008 | Van der Merwe et al. | |
| 2008/0123650 A1 * | 5/2008 | Bhaskar ......................... | 370/392 |
| 2008/0317032 A1 * | 12/2008 | Anschutz ....................... | 370/392 |
| 2009/0135815 A1 | 5/2009 | Pacella | |
| 2009/0141651 A1 * | 6/2009 | White et al. ................... | 370/254 |
| 2010/0008375 A1 * | 1/2010 | Lee et al. ....................... | 370/401 |
| 2010/0278044 A1 * | 11/2010 | Wong et al. .................... | 370/235 |
| 2011/0128969 A1 * | 6/2011 | Scholl ............................ | 370/411 |
| 2012/0163373 A1 * | 6/2012 | Lo et al. ......................... | 370/354 |

* cited by examiner

*Primary Examiner* — Phirin Sam
(74) *Attorney, Agent, or Firm* — Hanley, Flight & Zimmerman, LLC

(57) ABSTRACT

Example methods, apparatus and articles of manufacture to manipulate packet routing are disclosed. A disclosed example method includes extracting a destination address from a first packet, querying a route table based on the destination address to obtain a first label associated an egress router, querying the route table based on the destination address to obtain a second label associated with an interface of the egress router, forming a second packet from the first packet, the second packet including the first and second labels, and routing the second packet to the egress router based on the first label.

19 Claims, 6 Drawing Sheets

METHODS, APPARATUS AND ARTICLES OF MANUFACTURE TO MANIPULATE PACKET ROUTING

FIELD OF THE DISCLOSURE

This disclosure relates generally to packet routing and, more particularly, to methods, apparatus and articles of manufacture to manipulate packet routing.

BACKGROUND

Communication network operators (e.g., Internet/Applications Service Providers and/or Enterprise customers) are increasingly adopting label switching to route packets within communication networks. As data packets enter a label switching based network they are assigned labels, and subsequent packet-forwarding and/or packet-routing decisions within the network are made based on these labels without the need to examine the contents of the packets.

DETAILED DESCRIPTION

Example methods, apparatus and articles of manufacture to manipulate packet routing are disclosed. A disclosed example method includes extracting a destination address from a first packet, querying a route table based on the destination address to obtain a first label associated an egress router, querying the route table based on the destination address to obtain a second label associated with an interface of the egress router, forming a second packet from the first packet, the second packet including the first and second labels, and routing the second packet to the egress router based on the first label.

A disclosed example apparatus includes a database module to query a route table based on a destination address contained in a first packet to obtain a first label associated an egress router and query the route table based on the destination address to obtain a second label associated with an interface of the egress router, a routing module to form a second packet from the first packet, the second packet including the first and second labels, and an interface to transmit the second packet toward the egress router based on the first label.

Another disclosed example method includes receiving a first route advertisement from a first provider edge (PE) router, the first route advertisement including next-hop routing information associated with a destination and a label associated with an interface of the first PE router, modifying the next-hop routing information to form first modified next-hop routing information, the first modified next-hop routing information to redirect a packet addressed to the destination, and sending a second route advertisement to a second PE router, the second route advertisement including the first modified next-hop routing information and the label.

In the interest of brevity and clarity, throughout the following disclosure references will be made to example multiprotocol label switching (MPLS) based communication systems 100 and 500 of FIGS. 1 and 5, respectively. However, the example methods, apparatus and articles of manufacture described herein to manipulate packet routing are applicable to other networks using other label switching routing protocols, implemented using other network topologies, and/or having other desired routing characteristics. Further, within particular examples described herein a router may be referred to as an egress router and/or an ingress router. However, the identification of a router as an ingress router or an egress router only relates to the transport of particular packets and/or packet streams. Thus, a router may simultaneously operate as an ingress router for a first stream of packets and as an egress router for a second stream of packets. The adjectives ingress and egress serve only to clarify a router's functionality during descriptions of the example communication systems 100 and 500.

Figure 1:
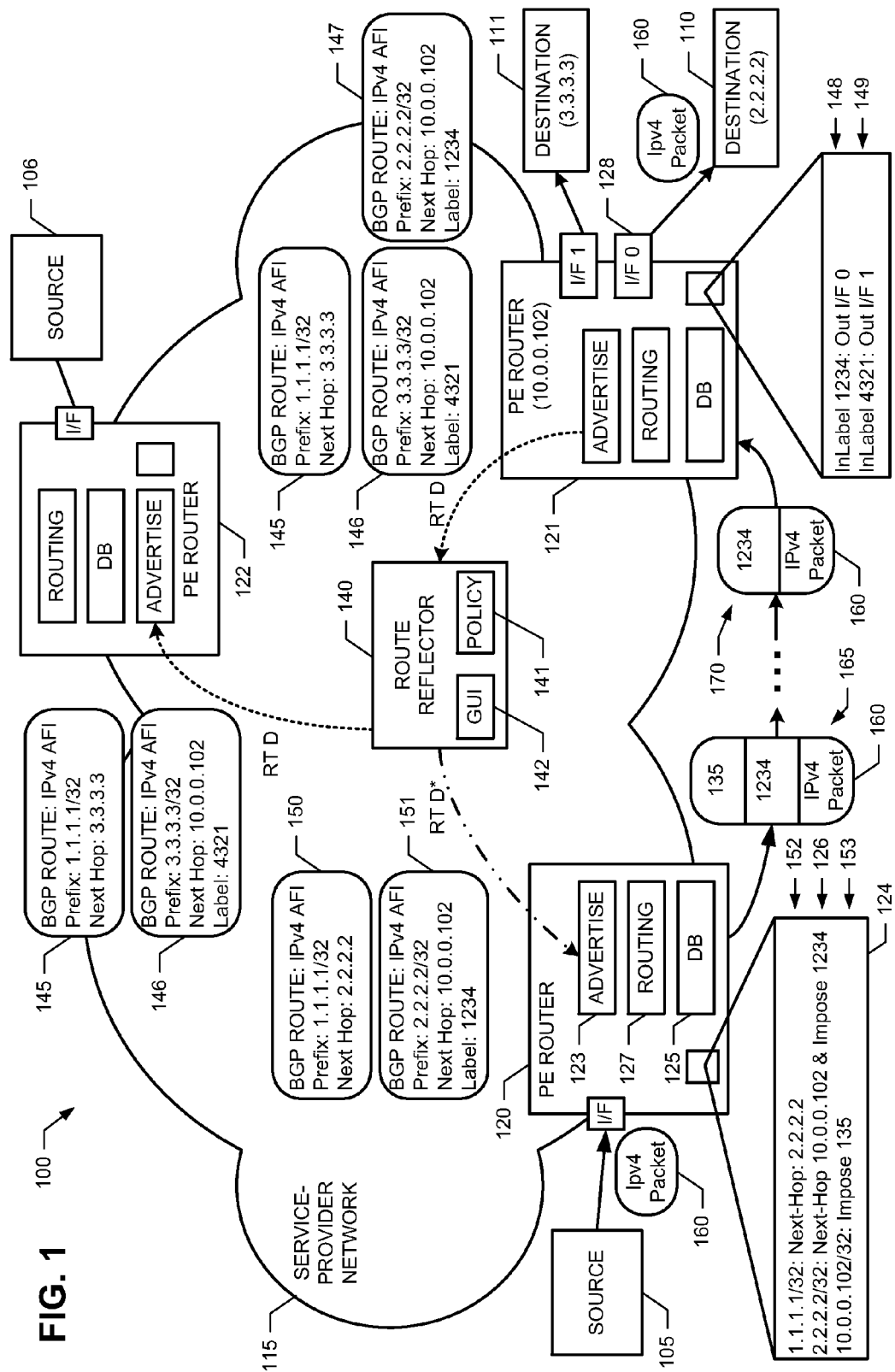
FIG. 1 is a schematic illustration of an example communication system constructed in accordance with the teachings of this disclosure.

FIG. 1 illustrates the example MPLS-based communication system 100. To facilitate communication services between a plurality of sources, two of which are designated at reference numerals 105 and 106, and a plurality of destinations, two of which are designated at reference numerals 110 and 111, the example communication system 100 of FIG. 1 includes a service-provider network 115. To route and/or transport data between and/or among the example sources 105 and 106 and the example destinations 110 and 111, the example service-provider network 115 of FIG. 1 includes a plurality of PE routers, three of which are designated at reference numerals 120, 121 and 122. The example PE routers 120-122 of FIG. 1 are communicatively coupled to each other via any number and/or type(s) of communication paths (not shown) that allow any particular PE router 120-122 to communicate with at least some, but not necessarily all of, the other PE routers 120-122.

To send and receive route advertisements, each of the example PE routers 120-122 of FIG. 1 includes a route advertisement module such as a border gateway protocol (BGP) module and/or engine, one of which is designated at reference numeral 123. By sending, for example, BGP route advertisements, each of the example route advertisement modules 123 of FIG. 1 publishes and/or exports route information concerning the sources 105 and 106 and/or destinations 110 and 111 that are communicatively coupled to the PE router 120-122 associated with the route advertisement module 123. Based on received BGP route advertisements, the example route advertisement modules 123 of FIG. 1 build, compile, update, maintain and/or construct a respective route table, one of which is designated at reference numeral 124. The export and import of route advertisements may be implemented in accordance with one or more import and/or export policies (not shown).

To manage, modify and/or query the example route tables 124, each of the example PE routers 120-122 of FIG. 1 includes a database module, one of which is designated at reference 125. Based on, for example, a destination address, a next-hop address and/or a label, the example database modules 125 of FIG. 1 locate routing information in the route table 124 by performing one or more queries. For example, a particular database module 125 can query its respective route table 124 to obtain a route table record 126 associated with a particular destination address 2.2.2.2. Routing information and/or route table records 126, 152, 153 may be stored in the example route tables 124 using any number and/or type(s) of data structures. The example route tables 124 may be implemented using any number and/or type(s) of memory(-ies), memory device(s) and/or storage device(s).

To route packets based on labels, each of the example PE routers 120-122 of FIG. 1 includes any number and/or type(s) of routing modules, one of which is designated at reference numeral 127. The example routing modules 127 of FIG. 1 route packets in accordance with any label switching protocol such as MPLS. Example processes that may be carried out to implement the example routing modules 127 are described below in connection with FIGS. 3 and 4.

To communicatively couple the sources 105 and 106 and the destinations 110 and 111 to respective PE routers 120-122, each of the example PE routers 120-122 of FIG. 1 includes any number and/or type(s) of communication interfaces, one of which is designated at reference numeral 128.

The example destinations 110 and 111 of FIG. 1 represent aliased destinations. That is, both of the example destinations 110 and 111 are associated with the same IP address of 1.1.1.1. Traditionally, the PE router 121 associated with the aliased destinations 110 and 111 would route packets addressed to the shared IP address 1.1.1.1 to one of the destinations 110 and 111 by default, or would implement load sharing between the destinations 110 and 111. However, such traditional methods do not enable particular packet flows from particular ingress routers 120 and 122 to be directed to a particular destination 110, 111 without having to modify routing policies on the egress PE router 121. Further, such conventional methods do not enable the PE routers 120-122 to forward packets to the shared IP address 1.1.1.1 via different paths. That is, a packet destined for a particular destination is conventionally always routed to the same adjacency based on route table programming. Further still, such conventional routing methods do not allow traffic to be routed differently for ingress versus egress packet flows. As discussed below in connection with FIG. 5, such ingress versus egress routing flexibilities are needed to implement services such as uniform resource locator (URL) scrubbing, protocol debugging and/or traffic monitoring.

To overcome at least these limitations, the example communication system 100 of FIG. 1 uses label stacking at ingress PE routers to override and/or control the conventional routing and/or forwarding decisions made at egress routers—for some packet flows. In general, when one or more packet flows are to be routed to particular interfaces of an egress router (e.g., the example interface 128 of the example PE router 121), an ingress router (e.g., the example PE routers 120) adds an inner label to each packet of the packet flow(s) in addition to the conventional label(s) added by the ingress router to facilitate routing of the packet(s) through the network 115. When packets with the additional inner label are received at the appropriate egress PE router (e.g., the PE router 121), the egress PE router removes the inner label and routes the packets directly to the interface associated with the inner label, without having to examine the contents of the packets. When other packets are received at the egress PE router that do not contain an inner label, the egress PE router examines the contents of the packets and routes them in accordance with any past, present and/or future routing protocol(s) and/or policy(-ies). As described below, a route reflector 140 informs the ingress PE routers what inner label(s), if any, are to be added to which packet flows.

Figure 2:
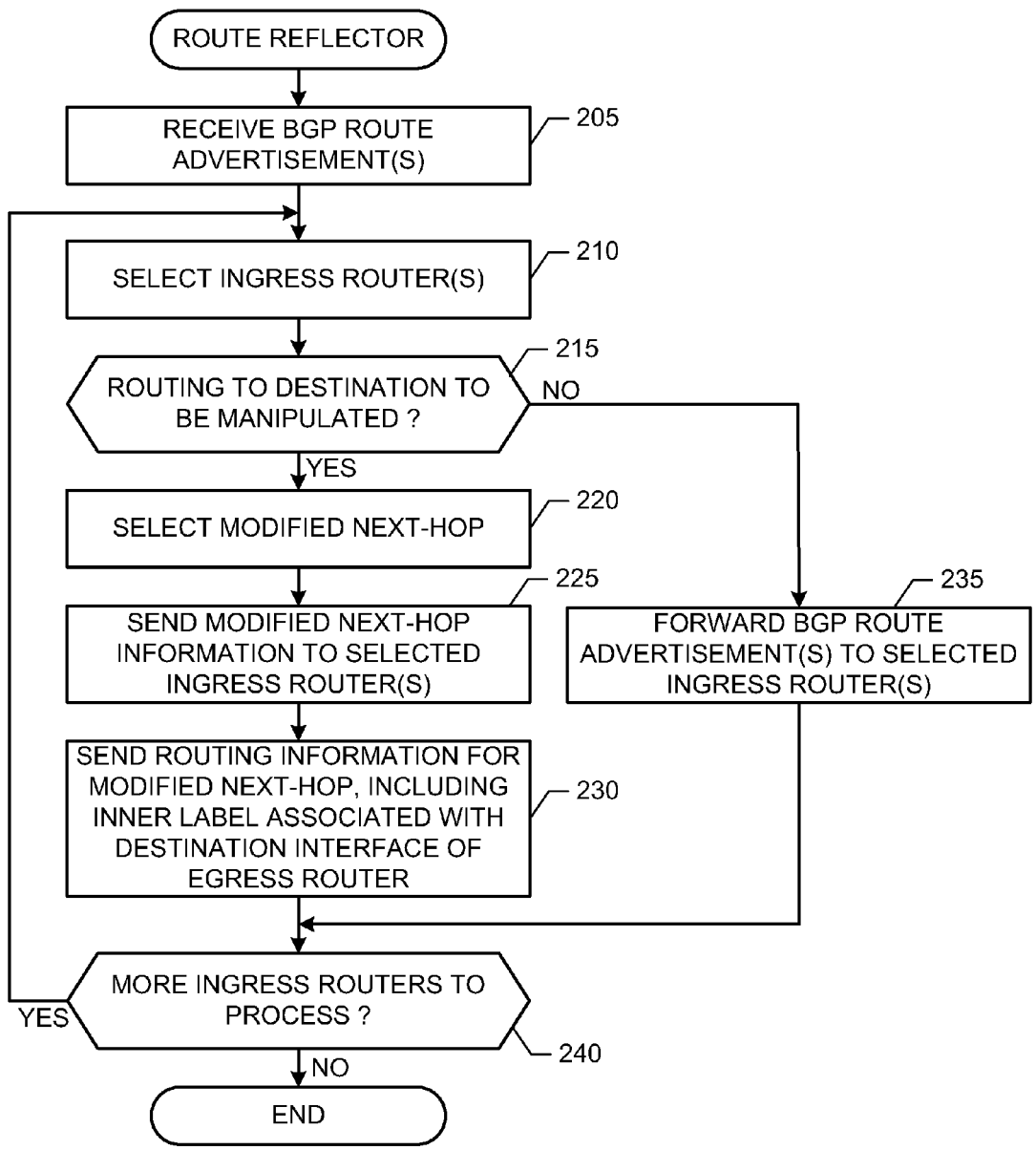
FIG. 2 is a flowchart representative of an example process that may be carried out to implement the example route reflectors of FIGS. 1 and 5.
Figure 3:
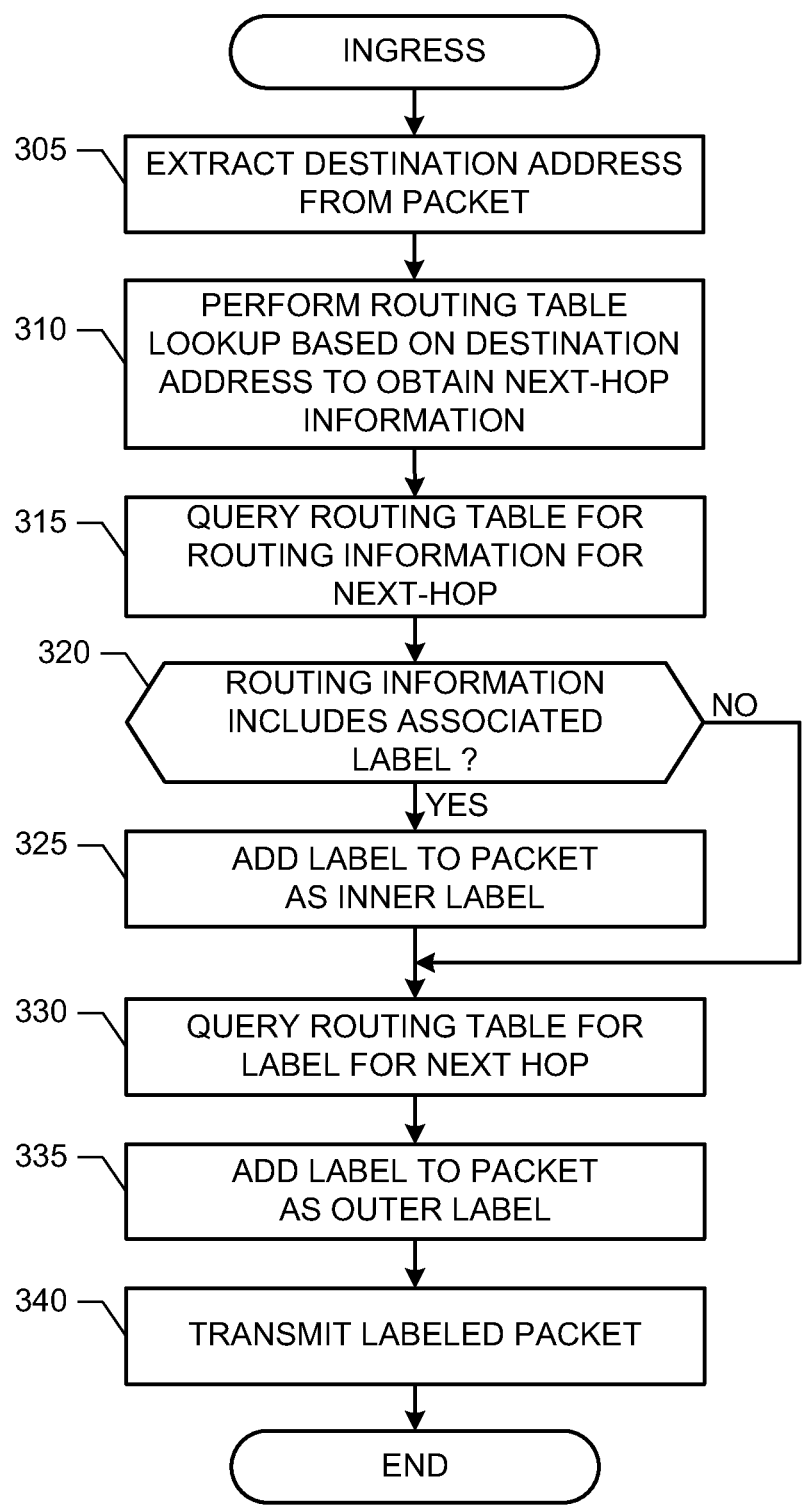
FIGS. 3 and 4 are flowcharts representative of example processes that may be carried out to implement the example provider edge (PE) routers of FIGS. 1 and 5.
Figure 4:
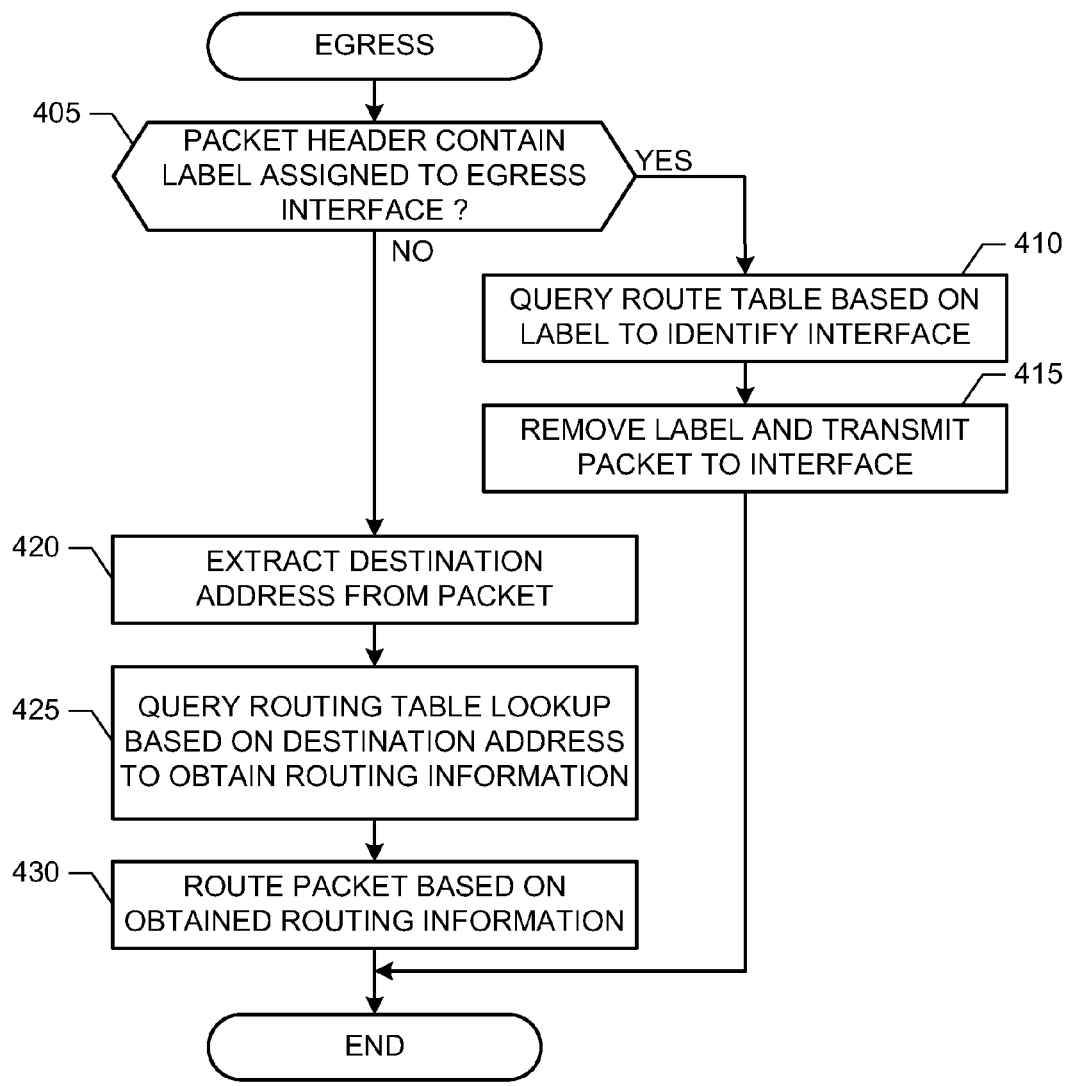

An example operation of the example communication system 100 of FIG. 1 will be discussed in detail in connection with the example processes of FIGS. 2, 3 and 4. FIG. 2 is a flowchart representative of an example process that may be carried out to implement the example route reflector 140 of FIGS. 1 and 5. FIGS. 3 and 4 are flowcharts representative of example processes that may be carried out to implement the PE routers 120-122. FIG. 3 illustrates an ingress process and FIG. 4 illustrates an example egress process. The example processes of FIGS. 2-4 may be carried out by a processor, a controller and/or any other suitable processing device. For example, the processes of FIGS. 2-4 may be embodied in coded instructions stored on any article of manufacture, such as any tangible computer-readable media. Example tangible computer-readable media include, but are not limited to, a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 2-4 may be implemented using any combination(s) of application specific integrated circuit(s) (ASIC(s)), programmable logic device(s) (PLD(s)) and/or field programmable logic device(s) (FPLD(s)), discrete logic, hardware, firmware, etc. Also, some or all of the example processes of FIGS. 2-4 may instead be implemented manually or as any combination of any of the foregoing techniques, for example, any combination of firmware, software, discrete logic and/or hardware. Further, many other methods of implementing the example operations of FIGS. 2-4 may be employed. For example, the order of execution of the blocks may be changed, and/or one or more of the blocks described may be changed, eliminated, sub-divided, or combined. Additionally, any or all of the example processes of FIGS. 2-4 may be carried out sequentially and/or carried out in parallel by, for example, separate processing threads, processors, devices, discrete logic, circuits, etc.

The example route advertisement module 123 of the example PE router 121 of FIG. 1 sends BGP route advertisements 145, 146 and 147 for the example destinations 110 and 111 communicatively coupled to the PE router 121. The example advertisement 145 of FIG. 1 contains a default next-hop address of 3.3.3.3 for the shared address 1.1.1.1. The example advertisement 146 of FIG. 1 contains a next-hop address of 10.0.0.102 for the default next-hop address of 3.3.3.3 and indicates that a label of 4321 was assigned to the interface associated with the destination address 3.3.3.3. The example advertisement 147 of FIG. 1 contains a next-hop address of 10.0.0.102 for a destination address 2.2.2.2 and indicates that a label of 1234 was assigned to the interface associated with the destination address 2.2.2.2. Corresponding to the example BGP route advertisements 146 and 147, the example route table 124 of the example PE router 121 contains a first record 148 indicating that received packets containing a label of 1234 are to be routed out interface 128, and a second record 149 indicating that received packets containing a label of 4321 are to be routed out an interface associated with the destination 111.

The example route reflector 140 of FIG. 1 receives the example BGP route advertisements 145-147 (block 205 of FIG. 2). Based on one or more policies 141, the example route reflector 140 of FIG. 1 selects one or more ingress PE routers 120-122 that are to receive route advertisements based on the received advertisements 145-147 (block 210).

If the selected PE routers 120-122 are to have their routing manipulated (e.g., are to route packets directed to the shared address 1.1.1.1 to the destination 110 rather than the default destination 111) (block 215), the example route reflector 140 selects a modified next-hop address based on the policy(-ies) 141 (block 220). In the illustrated example of FIG. 1, the route reflector 140 selects the destination address 2.2.2.2 rather than the destination address 3.3.3.3 as the next-hop for the shared address 1.1.1.1 at the PE router 120. The route reflector 140 sends a BGP route advertisement 150 to the ingress PE router 120 containing the modified next-hop address of 2.2.2.2 for the shared address 1.1.1.1 (block 225), and sends another BGP route advertisement 151 to the ingress PE router 120 containing routing information for the next-hop address 2.2.2.2 including the label 1234 assigned to the interface 128 associated with the destination 110 (block 230).

Returning to block 215, if the selected PE routers 120-122 are not to have their routing manipulated (block 215), the route reflector 140 may simply forward the BGP advertisements 145 and 146 to the selected PE routers 120-122 (block 235). In the illustrated example of FIG. 1, the PE router 122 is to route packets addressed to the shared address 1.1.1.1 to the default next-hop address 3.3.3.3.

If there are more PE routers 120-122 to process (block 240), control returns to block 210 to select one or more additional PE routers 120-122. Otherwise, control exits from the example process of FIG. 2.

To enable the example policies 141 to be created, set, modified and/or deleted, the example route reflector 140 of FIG. 1 includes any number and/or type(s) of graphical user interfaces (GUIs), one of which is designated at reference numeral 142. Via the example GUI 142 of FIG. 1 a person such as a technician and/or a network operator can set the policies 141 to manipulate packet routing by selecting which next-hop information is to be modified and to what address(es).

Based on the received BGP route advertisements 145, 146, 150 and 151, the example route advertisement modules 123 of the example ingress PE routers 120 and 122 update their respective route tables 124. For example, based on the BGP route advertisements 150 and 151, the example route table 124 of the ingress PE router 120 is populated with three records. The first record 152 indicates that the next-hop for address 1.1.1.1 is the address 2.2.2.2. The second record 126 indicates that the next-hop for address 2.2.2.2 is address 10.0.0.102 and that an inner label of 1234 is to be added to packets addressed to the next-hop address 2.2.2.2. The third record 153 indicates that the label 135 is to be added to packets having the next-hop address of 10.0.0.102.

When an example ingress packet 160 is received at the example ingress PE router 120, the example routing module 127 extracts the destination address from the received packet 160 (block 305 of FIG. 3). In the illustrated example of FIG. 1, the packet 160 is addressed to the shared address 1.1.1.1. Based on the extracted destination address, the example database module 125 queries the route table 124 to obtain the example record 152 containing the next-hop information for the shared address 1.1.1.1 (block 310). In the example of FIG. 1, the next-hop for address 1.1.1.1 at the PE router 120 is the address 2.2.2.2. The example database module 125 queries the route table 124 based on the next-hop address 2.2.2.2 to obtain the example record 126 containing the next-hop information for the destination address 2.2.2.2 and, if available, an inner label 1234 assigned to the interface 128 of the egress PE router 121 (block 315). In the example of FIG. 1, the next-hop for the address 2.2.2.2 is the address 10.0.0.102.

If example record 126 includes an inner label (block 320), the example routing module 127 adds the inner label 1234 from the record 126 to the packet 160 (block 325). The example database module 125 queries the route table 124 to obtain the record 153 containing the label used to route packets to the address 10.0.0.102 (block 330). In the example of FIG. 1, the label assigned to the address 10.0.0.102 is 135. The routing module 127 adds the outer label 135 to the packet 160 (block 335) and transmits the labeled packet 165 (block 340). Control then exits from the example process of FIG. 3.

The example outer label 135 is used to route the packet 165 through the service-provider network 115 to the egress PE router 121. At the last PE router (not shown) prior to the egress PE router 121, the outer label 135 is removed, forming a packet 170 including only the inner label 1234.

When the example packet 170 of FIG. 1 is received at the egress PE router 121, the routing module 127 determines whether the packet 170 includes the inner label 1234 (block 405 of FIG. 4). If the packet 170 includes the inner label 1234 (block 405), the database module 125 queries the route table 124 of the egress PE router 121 to identify the interface 128 associated with the label 1234 (block 410). The routing module 127 removes the label 1234 from the packet 170 and transmits the original packet 160 out the identified interface 128 to the destination 110 (block 415). Control then exits from the example process of FIG. 4.

Returning to block 405, if the packet 170 does not contain the inner label 1234 (block 405), the example routing module 127 extracts the destination address 1.1.1.1 from the packet 170 (block 420) and the database module 125 performs one or more queries of the route table 124 associated with the egress PE router 121 to identify the interface associated with the destination address 1.1.1.1 (block 425). The routing module 127 transmits the packet 160 out the identified interface to the destination 110, 111 (block 430). Control then exits from the example process of FIG. 4.

Packets addressed to the shared address 1.1.1.1 will be routed by and/or from the example PE router 122 using a similar method. However, because the BGP route advertisement 145 sent to the ingress PE router 122 contains a next-hop address of 3.3.3.3 for the shared address 1.1.1.1, such packets will be routed from the PE router 122 to the destination 111 rather than to the destination 110. Because such packets are to be routed to the default next-hop address 3.3.3.3 specified in the BGP route advertisement 145, the PE router 122 need not add the inner label 1234 when routing packets to the shared address 1.1.1.1.

While an example communication system 100 has been illustrated in FIG. 1, the elements illustrated in FIG. 1 may be combined, divided, re-arranged, eliminated and/or implemented in any way. Further, the example PE routers 120-122, the example modules 123, 125, and 127, the example route tables 124, the example route reflector 140, the example GUI 142 and/or, more generally, the example communication system 100 of FIG. 1 may be implemented by hardware, software, firmware and/or any combination of hardware, software and/or firmware. Thus, for example, any of the example PE routers 120-122, the example modules 123, 125, and 127, the example route tables 124, the example route reflector 140, the example GUI 142 and/or, more generally, the example communication system 100 may be implemented by one or more circuit(s), programmable processor(s), ASIC(s), PLD(s), FPLD(s), etc. When any of the appended apparatus claims are read to cover a purely software and/or firmware implementation, at least one of the example PE routers 120-122, the example modules 123, 125, and 127, the example route tables 124, the example route reflector 140, the example GUI 142 and/or, more generally, the example communication system 100 are hereby expressly defined to include a tangible medium such as a memory, a DVD, a CD, etc. storing the software and/or firmware. Further still, the example communication system 100 may include additional devices, servers, systems, networks and/or processors in addition to, or instead of, those illustrated in FIG. 1, and/or may include more than one of any or all of the illustrated devices, servers, networks, systems and/or processors.

Figure 5:
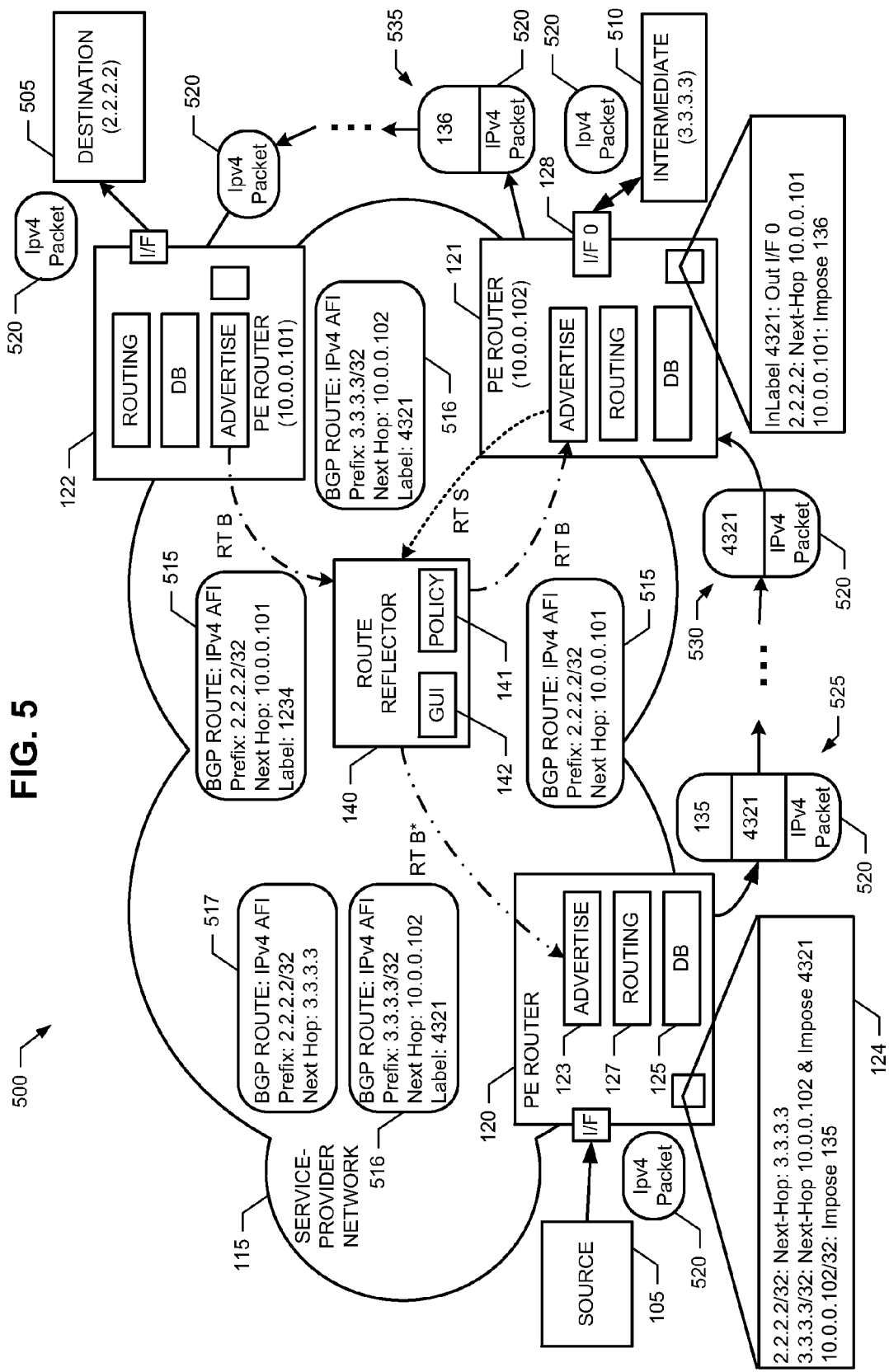
FIG. 5 is a schematic illustration of another example communication system constructed in accordance with the teachings of this disclosure.

FIG. 5 illustrates the example MPLS-based communication system 500. The illustrated example of FIG. 5 depicts another packet routing manipulation that may be implemented by the example methods, apparatus and articles of manufacture disclosed herein. In the example of FIG. 5, packets addressed to a destination 505 are initially routed to and/or through an intermediate destination 510. The example intermediate destination 510 of FIG. 5 may implement functionality such as, but not limited to, URL scrubbing, protocol debugging and/or traffic monitoring. In the example communication system 500 the PE router 121 operates both as an egress router and an ingress router for an example packet stream.

Because some elements of the example communication system 500 of FIG. 5 are identical to those discussed above in connection with FIG. 1, the description of identical elements is not repeated here. Instead, identical elements are illustrated with identical reference numerals in FIGS. 1 and 5, and the interested reader is referred back to the descriptions presented above in connection with FIG. 1 for a complete description of those like-numbered elements.

The example route advertisement module 123 of the example egress PE router 122 of FIG. 5 sends a route advertisement 515 for the destination 505. The example route advertisement 515 contains a next-hop address of 10.0.0.101, which is the IP address of the egress PE router 122, for the address 2.2.2.2 assigned to the destination 505 and includes a label 1234 assigned to the interface associated with the destination 505. The example route advertisement module 123 of the example PE router 121 likewise sends a route advertisement 516 for the intermediate destination 510. The example route advertisement 516 contains a next-hop address of 10.0.0.102 for the address 3.3.3.3 assigned to the intermediate destination 510 and a label assigned to the interface 128 associated with the intermediate destination 510.

As described above in the connection with the example process of FIG. 2, the example route reflector 140 of FIG. 5 determines that the next-hop information advertised by the egress router PE 122 is to be modified before being sent to the ingress PE router 120. The route reflector 140 sends a route advertisement 517 to the ingress PE router 120 containing a next-hop address of 10.0.0.102 for the destination address 2.2.2.2 rather than the next-hop address of 10.0.0.101 advertised by the egress PE router 122. However, the route advertisement 515 is forwarded to the PE router 121 without modification, and the route advertisement 515 is forward to the ingress PE router 120 without modification. As shown in FIG. 5, the example route advertisement modules 123 populate their respective route tables 124 based on the example route advertisements 515-517.

When an example ingress packet 520 is received at the example ingress PE router 120, the example routing module 127 extracts the destination address from the received packet 520 (block 305 of FIG. 3). In the illustrated example of FIG. 5, the packet 520 is addressed to the destination address 2.2.2.2. Based on the extracted destination address, the example database module 125 queries the route table 124 to obtain the next-hop information for the destination address 2.2.2.2 (block 310). In the example of FIG. 5, the next-hop for address 2.2.2.2 at the PE router 120 is the address 3.3.3.3. The example database module 125 queries the route table 124 based on the next-hop address 3.3.3.3 to next-hop information for the destination address 3.3.3.3 and the label 4321 assigned to the interface 128 of the egress PE router 121 (block 315). In the example of FIG. 5, the next-hop for the address 3.3.3.3 is the address 10.0.0.102.

The example routing module 127 adds the inner label 4321 to the packet 520 (block 325). The example database module 125 queries the route table 124 to obtain the label used to route packets to the address 10.0.0.102 (block 330). In the example of FIG. 5, the label assigned to the address 10.0.0.102 is 135. The routing module 127 adds the outer label 135 to the packet 520 (block 335) and transmits the labeled packet 525 (block 340).

The example outer label 135 is used to route the packet 525 through the service-provider network 115 to the PE router 121. At the last PE router (not shown) prior to the PE router 121, the outer label 135 is removed, forming a packet 530 including only the inner label 4321.

When the example packet 530 of FIG. 1 is received at the PE router 121, the routing module 127 determines that the packet 530 includes the inner label 4321 (block 405 of FIG. 4) and the database module 125 queries the route table 124 of the egress PE router 121 to identify the interface 128 associated with the label 4321 (block 410). The routing module 127 removes the label 4321 from the packet 530 and transmits the original packet 520 out the identified interface 128 to the intermediate destination 510 (block 415).

In the illustrated example of FIG. 5, the example intermediate destination 510 applies any number and/or type(s) of processes to the packet 520 and then transmits the packet 520 back to the PE router 121. Based on the route table 124 of the ingress PE router 121, the example routing module 127 and the database module 125 of the PE router 121 transmit the packet 520 with a label of 136. The label 136 enables the labeled packet 535 to be routed through the network 115 to the originally intended destination 505, as described above in connection with FIGS. 1-4.

Figure 6:
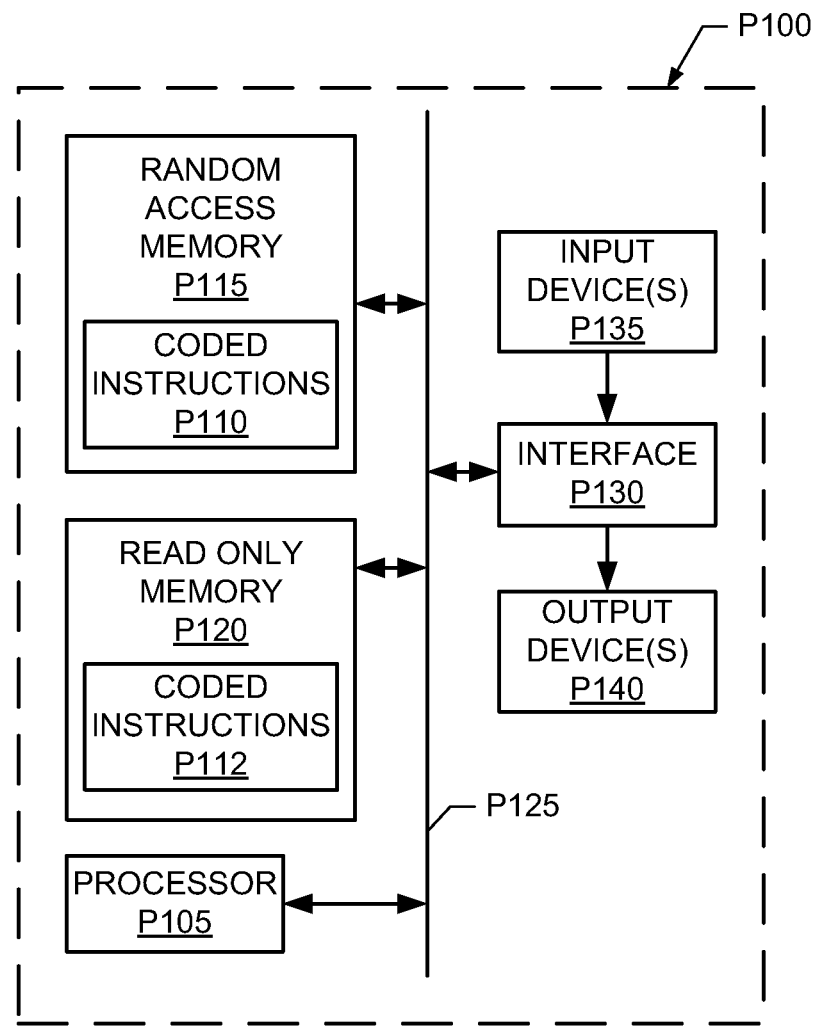
FIG. 6 is a schematic illustration of an example processor platform that may be used and/or programmed to carry out the example processes of FIGS. 2-4 and/or to implement any of all of the examples disclosed herein.

FIG. 6 is a schematic diagram of an example processor platform P100 that may be used and/or programmed to implement the example PE routers 120-122 and/or the example route reflectors 140 of FIGS. 1 and 5. For example, the processor platform P100 can be implemented by one or more general-purpose processors, processor cores, microcontrollers, etc.

The processor platform P100 of the example of FIG. 6 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may carry out, among other things, the example processes of FIGS. 2-4 to implement the examples disclosed herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to implement the example route tables 124.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input and output devices P135 and P140 may be used to, for example, implement the example interfaces 128.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   extracting a shared destination address from a first packet, the shared destination address being shared by first and second endpoint devices, the first endpoint device being a default next-hop for the shared destination address;
   querying a route table based on the shared destination address to obtain a first label associated with an egress router;
   querying the route table based on the shared destination address to obtain a second label associated with an interface of the egress router, the second label having been added to the route table in response to a modification of a next-hop address associated with the shared destination address from a first address corresponding to the first endpoint device to a second address corresponding to the second endpoint device;
   forming a second packet including the first and second labels; and
   routing the second packet to the egress router based on the first label.

2. The method as defined in claim 1, wherein the second packet is formed by adding the second label as an inner multi-protocol label switching label and adding the first label as an outer multi-protocol label switching label.

3. The method as defined in claim 1, wherein querying the route table to obtain the first label comprises:
   performing a first lookup in the route table based on the shared destination address to obtain a third address associated with the egress router; and
   performing a second lookup in the route table based on the third address associated with the egress router to obtain the first label.

4. The method as defined in claim 1, wherein querying the route table to obtain the first label comprises:
   performing a first lookup in the route table based on the shared destination address to obtain a second destination address;
   performing a second lookup in the route table based on the second destination address to obtain a third address associated with the egress router; and
   performing a third lookup in the route table based on the third address associated with the egress router to obtain the first label.

5. The method as defined in claim 1, wherein querying the route table to obtain the second label comprises:
   performing a first lookup in the route table based on the shared destination address to identify a routing table record; and
   extracting the second label from the routing table record.

6. The method as defined in claim 1, further comprising receiving a route advertisement message including the shared destination address and the second label.

7. The method as defined in claim 1, the modification of the next-hop address comprising replacing the first address corresponding to the first endpoint device with the second address corresponding to the second endpoint device as the next-hop for the shared destination address.

8. The method as defined in claim 7, wherein the interface of the egress router corresponds to the second endpoint device.

9. An apparatus comprising:
   a memory having machine readable instructions; and
   a processor which, when executing the instructions, performs operations comprising:
      extracting a shared destination address from a first packet, the shared destination address being shared by first and second endpoint devices, the first endpoint device being a default next-hop for the shared destination address;
      querying a route table based on the shared destination address to obtain a first label associated with an egress router;
      querying the route table based on the shared destination address to obtain a second label associated with an interface of the egress router, the second label having been added to the route table in connection with a modification of a next-hop address associated with the shared destination address from a first address corresponding to the first endpoint device to a second address corresponding to the second endpoint device;
      forming a second packet from the first packet, the second packet including the first and second labels; and
      conveying the second packet to the egress router based on the first label.

10. The apparatus as defined in claim 9, further comprising a route advertisement interface to receive a route advertisement message including the shared destination address and the second label.

11. The apparatus as defined in claim 9, wherein forming the second packet comprises adding the first and second labels to a header of the first packet.

12. The apparatus as defined in claim 9, wherein obtaining the first label comprises:
   performing a first lookup in the route table based on the shared destination address to obtain a third address associated with the egress router; and
   performing a second lookup in the route table based on the third address associated with the egress router to obtain the first label.

13. The apparatus as defined in claim 9, wherein obtaining the second label comprises:
   performing a first lookup in the route table based on the shared destination address to identify a routing table record; and
   extracting the second label from the routing table record.

14. A tangible machine readable storage medium comprising instructions that, when executed, cause a machine to perform a method comprising:
  extracting a shared destination address from a first packet, the shared destination address being shared by first and second endpoint devices, the first endpoint device being a default next-hop for the shared destination address;
  querying a route table based on the shared destination address to obtain a first label associated with an egress router;
  querying the route table based on the shared destination address to obtain a second label associated with an interface of the egress router, the second label having been added to the route table due to a modification of a next-hop address of the shared destination address from a first address corresponding to the first endpoint device to a second address corresponding to the second endpoint device;
  forming a second packet from the first packet, the second packet including the first and second labels; and
  route the second packet to the egress router based on the first label.

15. The tangible machine readable storage medium as defined in claim 14, wherein the method comprises forming the second packet by adding the second label as an inner multi-protocol label switching label and adding the first label as an outer multi-protocol label switching label.

16. The tangible machine readable storage medium as defined in claim 14, wherein the method comprises querying the route table to obtain the first label by:
  performing a first lookup in the route table based on the shared destination address to obtain a third address associated with the egress router; and
  performing a second lookup in the route table based on the third address associated with the egress router to obtain the first label.

17. The tangible machine readable storage medium as defined in claim 14, wherein the method further comprises querying the route table to obtain the first label by:
  performing a first lookup in the route table based on the shared destination address to obtain a second destination address;
  performing a second lookup in the route table based on the second destination address to obtain a third address associated with the egress router; and
  performing a third lookup in the route table based on the third address associated with the egress router to obtain the first label.

18. The tangible machine readable storage medium as defined in claim 14, wherein the method further comprises querying the route table to obtain the second label by:
  performing a first lookup in the route table based on the shared destination address to identify a routing table record; and
  extracting the second label from the routing table record.

19. The tangible machine readable storage medium as defined in claim 14, wherein the method further comprises receiving a route advertisement message including the shared destination address and the second label.

* * * * *